Oct. 2, 1934.  L. E. W. VAN ALBADA  1,975,302
FINDER FOR PHOTOGRAPHIC CAMERAS
Filed Sept. 30, 1930   2 Sheets-Sheet 1

Inventor:

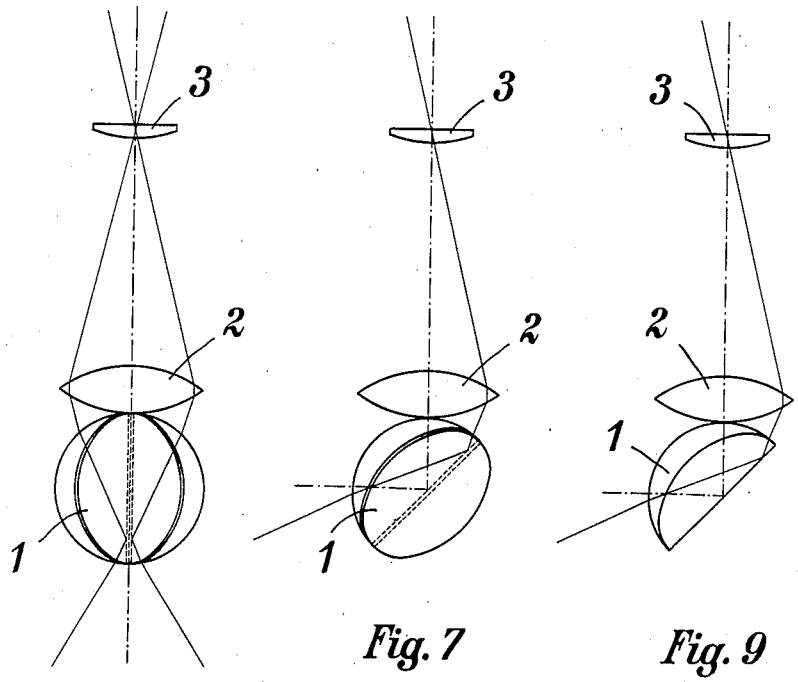
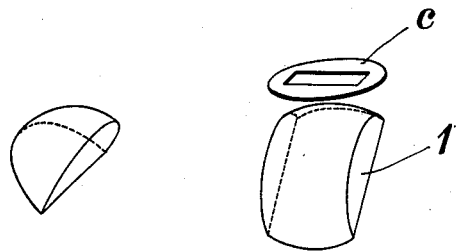

Patented Oct. 2, 1934

1,975,302

UNITED STATES PATENT OFFICE 1,975,302

FINDER FOR PHOTOGRAPHIC CAMERAS

Lieuwe E. W. van Albada, Amsterdam, Netherlands, assignor to the firm Carl Zeiss, Jena, Germany Application September 30, 1930, Serial No. 485,508
In France October 3, 1929

10 Claims. (Cl. 88—1.5)

The present invention concerns a finder for photographic cameras, with which is used a telescope whose objective projects a real image of the object to be photographed while an ocular serves for viewing the said image. The invention affords the finder a specially compact construction and, at the same time, when the objective is made to consist of a converging lens both refracting surfaces of which belong to the surface of one and the same globe and of a second converging lens provided immediately behind the first one, it offers the advantage that an image may be produced which is not distorted.

When the finder is desired to afford straight vision, the first lens of the objective may be an entire globe. However, when the directions of the incident and emergent rays are to enclose an angle and when it is not desired to place a reflecting surface behind the objective, a section of a globe is used instead of the said whole globe, so that the axial ray is deflected, as a rule by approximately 90°, between the two refractions caused on the globe surface. If this reflecting surface, which goes through the globe centre, is constructed as a single reflecting surface or if two reflecting surfaces are made to form a roof surface, or, in other words, if either half a globe or the quarter of a globe is used, either an image erect only in one direction or a completely erect image is obtained. The image is completely erect, and the axis of the emergent ray pencil is parallel to that of the rays entering the objective, when four quarters of a globe are combined to form one globe. A complete erection of the image and a bent emergent pencil will be obtained when two quarters of a globe are combined to form one half globe. Whether the one or the other of the said two cases is applied, the refraction caused by the globular surfaces will not be affected.

Immediately behind the second converging lens, whose rear surface is quite near the image plane of the objective, can be provided a field stop for reducing the image to the desired size. This stop is rotatable, preferably through 90°, so as to permit to easily change from vertical to horizontal photographs and vice versa.

All optical conditions are appropriately so chosen that the telescope has a slight reducing effect. This means that a greater field of view can be attained and that, in spite thereof, the object to be photographed may be viewed in all its details.

Figures 1, 2, 3:
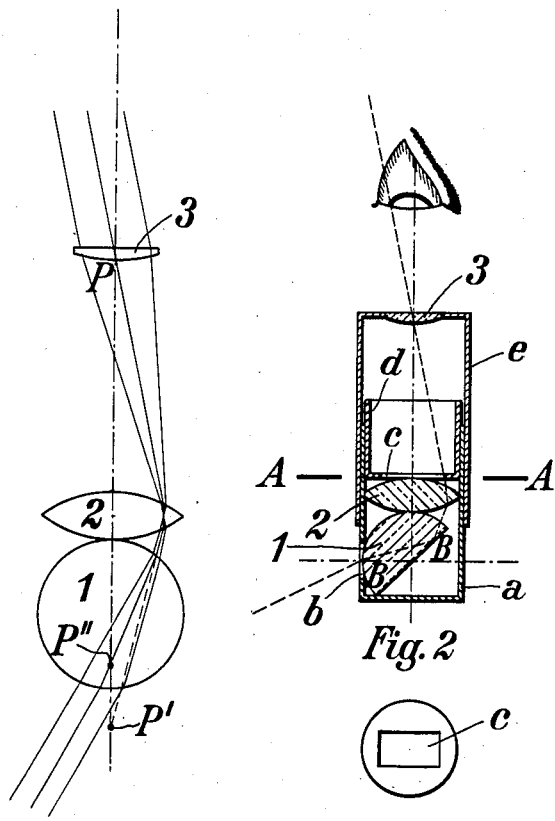
Figures 4, 6:
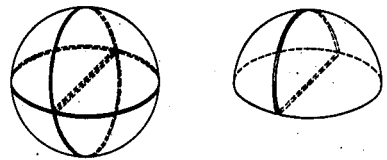

The figures of the accompanying drawings, 1 to 10, represent: Figure 1: A side view of an example of an optical system according to the invention and, at the same time, the path of the rays which is the same in all other examples. Figure 2: A longitudinal section through another example of the invention. Figure 3: The view of a section through the line A—A in Figure 2. Figure 4: The perspective illustration of another form of the front lens of the objective as used in the example according to Figure 1. Figure 5: A side view of an example of an optical system with a front lens according to Figure 4 and, at the same time, the path of two rays lying in a plane parallel to the plane of the drawing. Figure 6: The perspective illustration of another form of the front lens of the objective shown in Figure 2. Figure 7: A perspective side view of an example of an optical system with a front lens according to Figure 6 and, at the same time, the path of a ray lying in a plane parallel to the plane of the drawing. Figure 8: The perspective illustration of a third form of the front lens of the objective. Figure 9: A side view of an example of an optical system with a front lens according to Figure 8 and, at the same time, the path of a ray lying in a plane parallel to the plane of the drawing. Figure 10: The perspective illustration of another form of the optical system of a finder according to the invention.

In the example according to Figure 1 the front lens of the objective is a glass globe 1. Immediately behind this globe is a converging lens 2. An ocular lens is designated 3. The exit pupil of the system, P, is to be found at that place where the ocular lens 3 is situated. If applied alone, the lens 2 would project an image of the pupil P at the point designated P' and this point P' would be the entrance pupil of the system. By the globe 1, however, the said image is displaced towards P''. As the lens 2 is disposed approximately in the middle between the points P and P', these points being conjugated to each other with respect to lens 2, i. e. lens 2 projecting an image of each of these points at the other one, each of the distances of the points P and P' from the lens 2 is to be equal to twice the focal length of this lens 2. The point P'' is conjugated to the point P' with respect to the refracting surface of the globe 1. If $n$ is the refractive index and $r$ the radius of the globe 1, the distance of the point P' from the centre of the globe 1 is $nr$ and that of the point P'' from the said centre is $$\frac{r}{n}$$

In other words, when using glass of a refractive index $n=1.5$, the distance of the point P' from the refractive surface of the globe 1 is equal to approximately half the radius of this globe and when the point P'' lies within the globe at a distance equal to approximately one third of the radius of the globe, the object to be viewed will be imaged, according to well-known optical laws, practically without distortion, provided that the entrance pupil of the entire objective lies in a plane at right angles to the optical axis in the point P''. Under these conditions, and when taking into consideration that the thickness of the lens 2 is finite, the radius $r$ of the globe 1 is equal to approximately two thirds of the focal length of the lens 2.

In the example according to Figures 2 and 3 a cylindrical tube $a$ has near its lower end a lateral aperture $b$. Behind this aperture and inside the tube is half a globe, 1, the plane bounding surface B—B of which is inclined to the axis at 45°. Immediately behind the lens 1 is a converging lens 2 and behind this converging lens is inserted a tube $d$ which has in front a stop $c$ of rectangular aperture. An ocular lens 3 is fixed to the upper end of a tube $e$ into which the tube $a$ is inserted. Owing to the reflective effect of the surface B—B, the directions of the incident and emergent rays enclose an angle which depends on the inclination the surface B—B is given; in the drawing this angle has, for example, the value 90°. The optically effective surfaces according to the second example consisting only of the plane reflecting surface B—B and the optically effective surfaces illustrated in Figure 1, the ray path will be merely bent and not suffer any other variation with respect to the ray path according to the first example. It follows that the said two examples function in quite the same manner. The ocular 3 may be individually adapted to the refractive power of the observing eye by adjusting the tube $e$. By turning the tube $d$ the section of the image can be made optionally horizontal or vertical. As the ocular lens can be given a size which is greater than that of the pupil of the observing eye and as the reflexion on the surface B—B may be total, the greatest possible brightness of the image presented by the finder can be attained.

Figure 4 shows a whole globe consisting of four quarters that are arranged closely to each other. Being inserted instead of globe 1 in a system according to Figure 1 in such a manner that the straight edges of the four quarter-globes lie in the axis of the system as indicated in Figure 5, a completely erect image would result owing to the reflexion on the roof surfaces formed by the plane bounding surfaces of the quarter-globes.

Figure 6 shows a half-globe consisting of two quarter-globes combined to form one half-globe. If this half-globe were used in a system according to Figure 2 instead of the half-globe 1 as indicated in Figure 7, the image would be completely erect also in this case. A quarter-globe according to Figure 8, alone, could be used in the system according to Figure 2, in which case it would have to lie symmetrically to the drawing plane with its roof surface inclined towards the axis. This form of the optical system of the finder is indicated in Figure 9.

In all examples naturally only such portions of a globe are required as are necessary for the path of the rays; superfluous parts can be left away. For example, Figure 10 shows a half-globe 1 superfluous parts of which are taken away on both sides by two planes that are parallel to each other and are at right angles to the plane bounding surface of the half-globe. For the sake of better intelligibility the image stop $c$ is slightly raised in the drawings.

The new finder allows to obtain with very simple means a distortion-free wide-angled image which is limited sharply and without parallax and, without the necessity of special mirrors or reflecting prisms, presents itself to the observer's eye in any suitable viewing direction at an angle that is approximately five times as great as the one necessary in case of so-called diamond finders.

Finally, it must be pointed out that, owing to the image being visible not only in one single direction but within a great range of directions, each of the said whole, half, or quarter globes, alone, especially when having an image stop, can be used instead of one of the so-called diamond finders. For this reason the example according to Figure 10 is, in itself, an improved diamond finder.

I claim:

1. A finder for photographic cameras, comprising a casing, an objective disposed in the casing, the objective being composed of a converging lens, both refracting surfaces of which are parts of a single globular surface, and a second converging lens contiguous to the first one lying behind the same, and an ocular provided on the casing, the objective imaging the ocular in a plane at right angles to the optical axis, this plane being positioned within the first said lens at an axial distance equal to approximately one third of the radius of curvature of the globular surface measured from the light entrance surface of the lens.

2. In a finder according to claim 1, the first lens of the objective being an entire globe.

3. In a finder according to claim 1, the first lens of the objective consisting of half a globe the plane bounding surface of which is inclined by approximately 45° towards the axis of the casing.

4. In a finder according to claim 1, the first lens of the objective consisting of the quarter of a globe, bounded by the quarter of a globular surface and two planes intersecting each other by an angle of 90°, the line of the intersection being inclined by approximately 45° towards the axis of the casing and the said two plane surfaces lying symmetrically to the plane containing the said line of intersection and the said axis.

5. In a finder for photographic cameras, comprising a casing, an objective disposed in the casing, the objective being composed of a converging lens, both refracting surfaces of this lens being parts of a single globular surface, and a second converging lens contiguous to the first one and lying behind the same, and an ocular provided on the casing, the objective imaging the ocular in a plane at right angles to the optical axis, this plane being positioned within the first said lens at an axial distance equal to approximately one third of the radius of curvature of the globular surface measured from the light entrance surface of the lens, a stop being disposed behind the second lens of the objective.

6. In a finder according to claim 5, the said stop having a rectangular aperture.

7. In a finder according to claim 5, the said stop being rotatably disposed behind the second lens of the objective.

8. In a finder for photographic cameras, comprising a casing, an objective disposed in the casing, the objective being composed of a converging lens, both refracting surfaces of this lens being parts of a single globular surface, and a second converging lens contiguous to the first one and lying behind the same, and an ocular provided on the casing, the objective imaging the ocular in a plane at right angles to the optical axis, this plane being positioned within the first said lens at an axial distance equal to approximately one third of the radius of curvature of the globular surface measured from the light entrance surface of the lens, the second lens of the objective being biconvex.

9. In a finder for photographic cameras, comprising a casing, an objective disposed in the casing, the objective being composed of a converging lens, both refracting surfaces of this lens being parts of a single globular surface, and a second converging lens contiguous to the first one and lying behind the same, and an ocular provided on the casing, the objective imaging the ocular in a plane at right angles to the optical axis, this plane being positioned within the first said lens at an axial distance equal to approximately one third of the radius of curvature of the globular surface measured from the light entrance surface of the lens, the second lens of the objective and the ocular having a distance apart which is equal to approximately twice the focal length of the said lens, and the radius of curvature of the refracting surfaces of the first lens of the objective being equal to approximately two thirds of the focal length of the second lens.

10. In a finder for photographic cameras, comprising a casing, an objective disposed in the casing, the objective being composed of a converging lens, both refracting surfaces of this lens being parts of a single globular surface, and a second converging lens contiguous to the first one and lying behind the same, and an ocular provided on the casing, the objective imaging the ocular in a plane at right angles to the optical axis, this plane being positioned within the first said lens at an axial distance equal to approximately one third of the radius of curvature of the globular surface measured from the light entrance surface of the lens, the ocular having a focal length which is slightly greater than that of the front member of the objective.

LIEUWE E. W. van ALBADA.